(12) United States Patent
Wang et al.

(10) Patent No.: US 11,392,772 B2
(45) Date of Patent: Jul. 19, 2022

(54) CODING INFORMATION EXTRACTOR

(71) Applicant: Microsoft Technology Licensing, LLC, Redmond, WA (US)

(72) Inventors: Ying Wang, Shanghai (CN); Min Li, Shanghai (CN); Mengyan Lu, Shanghai (CN); Xiaoliang Shi, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/313,807

(22) PCT Filed: Dec. 25, 2018

(86) PCT No.: PCT/CN2018/123354
§ 371 (c)(1),
(2) Date: Dec. 27, 2018

(87) PCT Pub. No.: WO2020/132852
PCT Pub. Date: Jul. 2, 2020

(65) Prior Publication Data
US 2021/0312132 A1 Oct. 7, 2021

(51) Int. Cl.
*G06F 9/44* (2018.01)
*G06F 40/295* (2020.01)
*G06N 20/10* (2019.01)
*G06F 16/35* (2019.01)
*G06F 40/284* (2020.01)
*G06F 3/12* (2006.01)
(Continued)

(52) U.S. Cl.
CPC .......... *G06F 40/295* (2020.01); *G06F 3/1298* (2013.01); *G06F 8/31* (2013.01); *G06F 8/73* (2013.01); *G06F 16/355* (2019.01); *G06F 16/951* (2019.01); *G06F 16/958* (2019.01); *G06F 16/986* (2019.01); *G06F 40/284* (2020.01); *G06K 9/6215* (2013.01); *G06N 20/10* (2019.01); *G06N 20/00* (2019.01)

(58) Field of Classification Search
CPC ............ G06F 16/24578; G06F 16/951; G06F 40/295; G06F 16/958; G06F 16/93; G06F 16/986; G06F 8/73; G10L 15/18; G06N 3/0445; G06N 20/00; G06K 9/6215
See application file for complete search history.

(56) References Cited

U.S. PATENT DOCUMENTS 10,943,583 B1 * 3/2021 Gandhe .................. G10L 15/18
2006/0294077 A1 12/2006 Bluhm et al.
(Continued)

OTHER PUBLICATIONS

"International Search Report and Written Opinion Issued in PCT Application No. PCT/CN2018/123354", dated Sep. 26, 2019, 9 Pages.

*Primary Examiner* — Tuan A Vu

(57) ABSTRACT

A coding information extractor disclosed herein uses machine learning approach to extract coding information from documents. An implementation of the coding information extractor is implemented using various computer process instructions including scanning a document to generate a plurality of tokens, determining one or more features of the plurality of tokens using term frequency (TF), inverse document frequency (IDF), and code type similarity features, and determining field type, field name, and field value of the one or more of the tokens using named entity recognition (NER).

20 Claims, 5 Drawing Sheets

(51) Int. Cl.
*G06F 8/30* (2018.01)
*G06F 8/73* (2018.01)
*G06K 9/62* (2022.01)
*G06F 16/951* (2019.01)
*G06F 16/958* (2019.01)
*G06N 20/00* (2019.01)

(56) References Cited

U.S. PATENT DOCUMENTS

| | | |
|---|---|---|
| 2007/0156732 A1 | 7/2007 | Surendran et al. |
| 2009/0307213 A1* | 12/2009 | Deng ............... G06F 16/93 707/999.005 |
| 2009/0327243 A1* | 12/2009 | Pradhan ............ G06F 16/958 707/E17.046 |
| 2013/0151238 A1 | 6/2013 | Beaurpere et al. |
| 2014/0358929 A1 | 12/2014 | Bailey et al. |
| 2015/0205826 A1 | 7/2015 | Boudreau et al. |
| 2016/0147891 A1* | 5/2016 | Chhichhia ......... G06F 16/986 707/734 |
| 2016/0239487 A1* | 8/2016 | Potharaju ........ G06F 16/24578 |
| 2018/0240012 A1* | 8/2018 | Bhatt ............... G06N 3/0445 |
| 2018/0260474 A1* | 9/2018 | Surdeanu ........... G06F 16/951 |
| 2020/0184017 A1* | 6/2020 | Batra ............... G06F 40/295 |

* cited by examiner

CODING INFORMATION EXTRACTOR

BACKGROUND

In the technical documents in information technology (IT) industry, programming code is widely used as a description for a specific technique. In order to automatically inspect these code texts, information extraction is needed. However, these code texts usually origin from various types of the programming language, which makes it difficult to directly use a parser to understand these code texts. Specifically, to use such code parser requires expert knowledge of a specific programming language, which is hard to develop and maintain. Furthermore, a code parser is with fixed rule, which may fail to process code texts with typos and a code parser is generally not capable of processing pseudo-code which doesn't have a fixed syntax rule to parse.

SUMMARY

A coding information extractor disclosed herein uses machine learning approach to extract coding information from documents. An implementation of the coding information extractor is implemented using various computer process instructions including scanning a document to generate a plurality of tokens, determining one or more features of the plurality of tokens using term frequency (TF), inverse document frequency (IDF), and code type similarity features, and determining field type, field name, and field value of the one or more of the tokens using named entity recognition (NER).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

A further understanding of the nature and advantages of the present technology may be realized by reference to the figures, which are described in the remaining portion of the specification.

DETAILED DESCRIPTIONS

Figure 1:
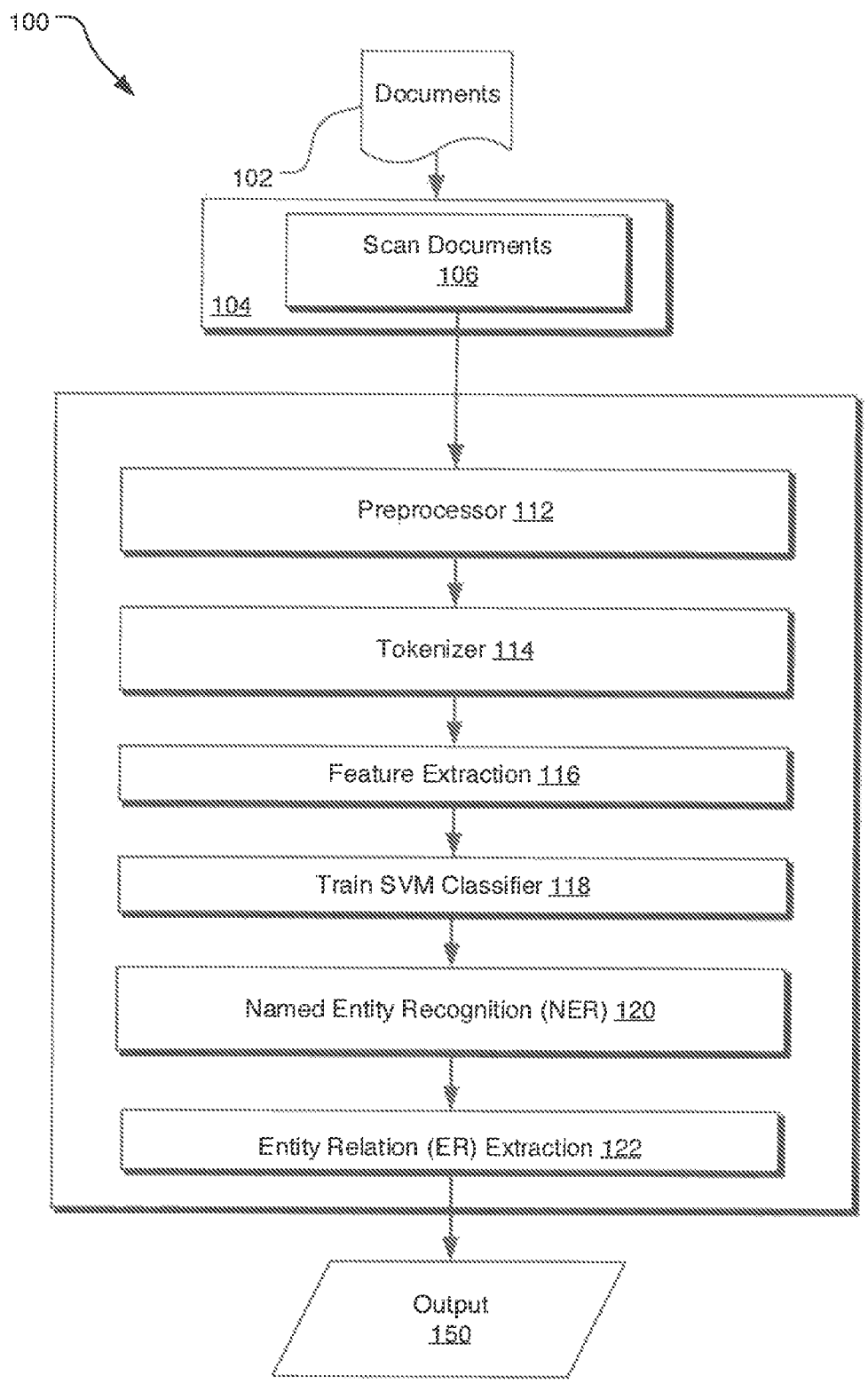
FIG. 1 illustrates an example implementation of a system for extracting coding information from documents.

FIG. 1 illustrates an example implementation of a code extractor system 100 for extracting coding information from documents. In one implementation, the code extractor system 100 may be deployed on a cloud environment. A document input module 104 of the code extractor system 100 may include a scanning module 106 to scans document 102. For example, the documents 102 may include various technical documents and the scanning module 106 scans the documents 102 and may store sentences from the document in one or more databases. As an example, the documents 102 may include a programming code written in a programming language such as C++, Java, etc. Alternatively, the documents 102 may include various pseudo code documents.

The technology disclosed herein solves a technical problem of extracting coding information from documents. Specifically, the coding information extractor disclosed herein uses machine learning approach to extract coding information from documents. An implementation of the coding information extractor is implemented using various computer process instructions including scanning a document to generate a plurality of tokens, determining one or more features of the plurality of tokens using term frequency (TF), inverse document frequency (IDF), and code type similarity features, and determining field type, field name, and field value of the one or more of the tokens using named entity recognition (NER). Thus, the technology disclosed herein solves a technical problem of analyzing documents efficiently to recognize and extract coding information without having to enumerate a large number of patterns or without having to provide a large number of coded rules to recognize coding information.

A preprocessor 112 identifies code text sections from the documents 102. For example, one of the documents 102 may be an IT document with natural language such as description or other comments and some coding sections. Specifically, such coding sections may include programming code written using C#. The preprocessing module 112 separates such coding sections and stores them separately to be further processed. In one implementation, the preprocessing section separates each line of the code sections into separate records. Examples, of such code sentences separated into a separate records may be as following:

```
typedef struct { LICENSE license; CERT cert1; CERT cert2;}
CERTIFIED_LICENSE; (CodeType: IDF)
typedef enum { LineJoinTypeMiter = 0x00000000, LineJoinTypeBevel =
0x00000001, LineJoinTypeRound = 0x00000002, LineJoinTypeMiterClipped =
0x00000003} LineJoinType; (CodeType: IDF)
RequireSortIndexHintValue ::= SEQUENCE { IndexOnly BOOLEAN} (CodeType:
ASN.1)
```

Furthermore, the preprocessor 112 groups some words into single predetermined words. For example, decimal or hexadecimal numbers are grouped into word 'NUM' and texts along with their quotation marks are grouped as 'STRING.' Subsequently, a tokenizer module 114 tokenizes various sections of these code sentences. In one implementation, the tokenizer module 114 uses various predefined rules to map known characters and words to predefined tokens. An example of such rules mapping known characters to predefined tokens is as following:

| Known Character or Word | Predefined Token |
|---|---|
| , | COMA |
| ; | SEMICOLON |
| : | COLON |
| { | L-BRACE |
| = | EQU |
| 0x00000000 | NUM |
| typedef | TYPEDEF |
| Struct | STRUCT |
| Integer | INTEGER |
| boolean | BOOLEAN |

Thus, the tokenizer module 114 may map a sentence "typedef struct {LICENSE license; CERT cert1; CERT cert2;} CERTIFIED_LICENSE" from a coding document to "TYPEDEF STRUCT L-BRACE LICENSE license SEMICOLON CERT cert1 SEMICOLON CERT cert2 SEMICOLON R-BRACE CERTIFIED_LICENSE SEMICOLON."

Subsequently, a feature extraction module 116 extracts various features from the tokenized sentence using term-frequency/inverse term-frequency (TF-IDF) statistics collected from the tokenized documents. To determine the TF-IDF statistics, first the feature extraction module 116 may generate various n-grams commonly occurring in the document and generate a dictionary of such n-grams. For example, for the tokenized document data given below, the term dictionary for up to two (2) grams may be as given below:

Tokenized Document Data

TYPEDEF STRUCT L-BRACE LICENSE license SEMICOLON CERT cert1 SEMICOLON CERT cert2 SEMICOLON R-BRACE CERTIFIED_LICENSE SEMICOLON
TYPEDEF ENUM L-BRACE LineJoinTypeMiter EQU NUM COMMA LineJoinTypeBevel EQU NUM COMMA LineJoinTypeRound EQU NUM COMMA LineJoinTypeMiterClipped EQU NUM R-BRACE LineJoinType SEMICOLON
RequireSortIndexHintValue COLON COLON EQU SEQUENCE L-BRACE indexOnly BOOLEAN R-BRACE
Term Dictionary (for one-grams and two-grams)

N = 1: TYPEDEF STRUCT, L-BRACE, LICENSE, license, SEMICOLON, ...
N = 2: TYPEDEF STRUCT, STRUCT L-BRACE. L-BRACE LICENSE, ...

Subsequently, the feature extraction module 116 generates a TF-IDF vector based on the term dictionary using a TF-IDF formula. TF represents the prevalence of a term t is a document d. Examples of TF formulas may be:

TF(t, d) raw count of the term t:
TF(t, d)=(0, 1) (1 if term t occurs, 0 otherwise);
TF(t, d)=log (1+$f_{t,d}$), where $f_{t,d}$=frequency of the term t in the document d.

On the other hand, the IDF is a measure of how much information a term t provides, i.e., whether the term is common or rare across various documents. The formula used for IDF may be:

IDF (t, D) log (N/|{d∈D:t∈d}|+1), where N is the total number of documents in the corpus of documents D However, in an alternate implementation, other TF-IDF formula may be used. Using above formula, for a code string with the term 'TYPEDEF,' ("TYPEDEF STRUCT L-BRACE LICENSE license SEMICOLON CERT cert1 SEMICOLON CERT cert2 SEMICOLON R-BRACE CERTIFIED_LICENSE SEMICOLON"), the TF=1 and the IDF=log (3/2+1) (given three (3) code strings, with two (2) of the code strings with the term 'TYPEDEF.'

Once the TF-IDF values are calculated for various terms, an operation 118 trains a support vector machine (SVM) classifier using the term TF-IDF vectors for various terms in the documents. The SVM classifier may outputs a vector of confidence level as to what is the type of code represented by the various code strings. An example, of such output confidence vector may be following:

[XML: 0.1; IDF: 0.8: ASN.1: 0.3; . . . ]

Subsequently, a named entity recognition (NER) operation 120 labels the terms in the code strings to one or more named entities. For example, such named entities may name the terms as a "Field Name," a "Field Value," etc. As an example, for a code string "typedef enum {LineJoinTypeMiter=0x00000000, LineJoinTypeBevel=0x00000001. LineJoinTypeRound=(1x00000002, LineJoinTypeMiterClipped=0x00000003}, LineJoinType," once it is tokenized to "TYPEDEF ENUM L-BRACE LineJoinTypeMiter EQU NUM COMMA LineJoinTypeBevel EQU NUM COMMA LineJoinTypeRound EQU NUM COMMA LineJoinTypeMiterClipped EQU NUM R-BRACE LineJoinType SEMICOLON," the NER operation 120 names various tokens as follows:

TYPEDEF ENUM L-BRACE [LineJoinTypeMiter (Field Name)] EQU [NUM (Field Value)] COMMA LineJoinTypeBevel EQU [NUM (Field Value)]COMMA [LineJoinTypeRound (Field Name)] EQU [NUM (Field Value)]COMMA [LineJoinTypeMiterClipped (Field Name)] EQU [NUM (Field Value)] R-BRACE [LineJoinType (Structure Name)] SEMICOLON An entity relation (ER) extraction operation 122 uses classifiers, such as an SVM classifier, to find relations between various named entities as identified in operation 120. Specifically, recognized entities from the NER operation are linked with each other with different relationships, such as Field Name->Field Type, Field->Parent Field, Field Value->Field Name, etc. Thus, for example, the ER extraction operation 122 may take the above string with the named entities and establish the following relations: [0x00000000 NUM (Field Value)] belongs to [LineJoinTypeMiter (Field Name)][LineJoinTypeMiter (Field Name)] is a child field of [LineJoinType (Structure Name)]

The output 150 may include the vectors of the various named entity relations as generated by the ER extraction operation 122. Other information in the output 150 may be, for example, records such as LineJoinTypeMiter, [Field Value: 0x00000000], LineJoinTypeMiter, [Parent: LineJoinType], etc.

Figure 2:
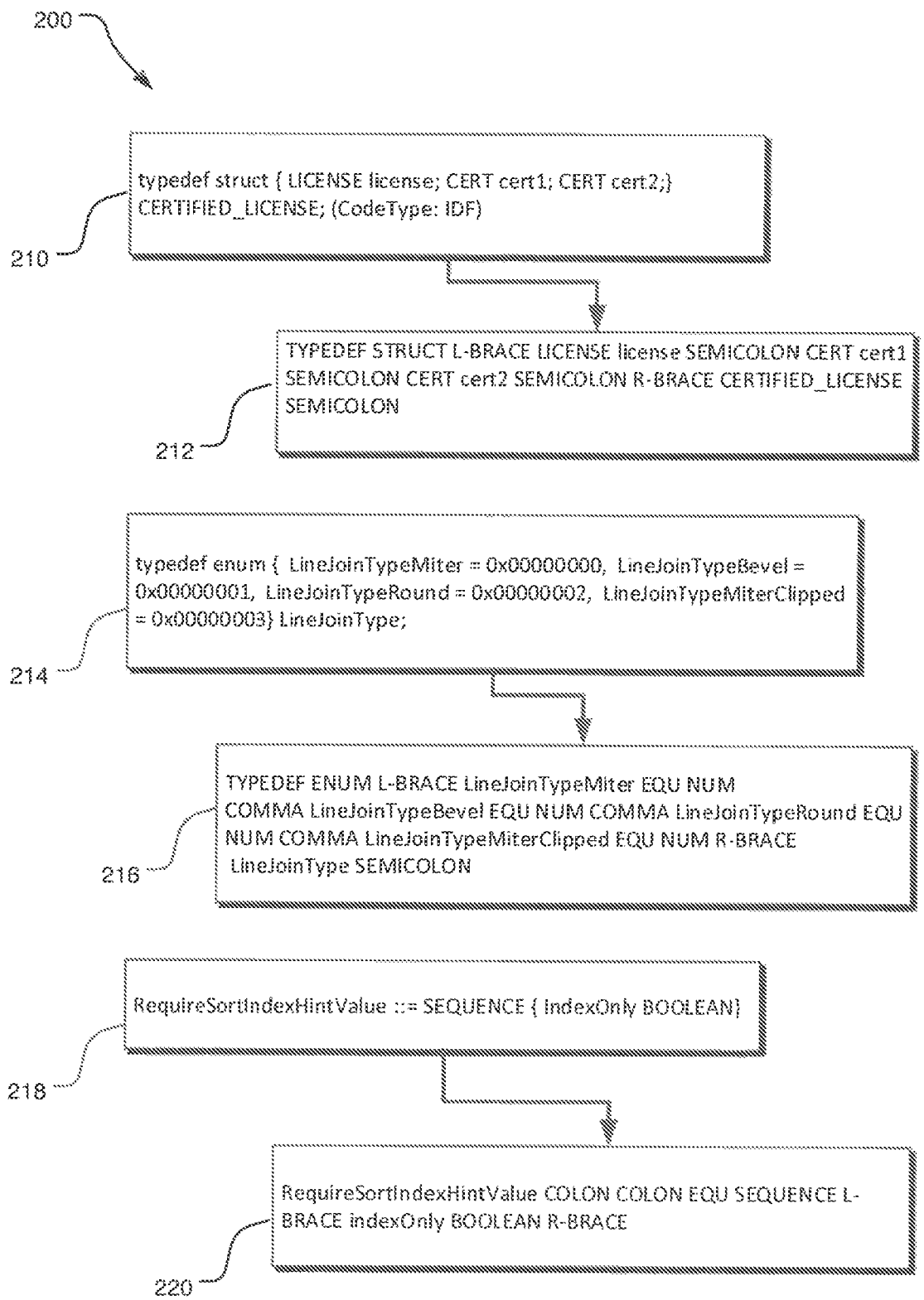
FIG. 2 illustrates an example schema of input data after it is tokenized.

FIG. 2 illustrates an example schema 200 of input data after it is tokenized. For example, such tokenization may use various predefined rules to map known characters and words to predefined tokens. For example, the word 'typedef' in a code string 210 is tokenized to 'TYPEDEF' whereas the character '{' is tokenized to 'L-BRACE' as shown in the tokenized output 212. Similarly, a symbol '=' in a code string 214 is tokenized to 'EQU' in an output string 216. The words of the input code strings that do not match any tokens as per the predefined rules are left as they are. Thus, the word 'RequireSortIndexHintValue' in the code string 218 is left as it is in the output code string 220.

Figure 3:
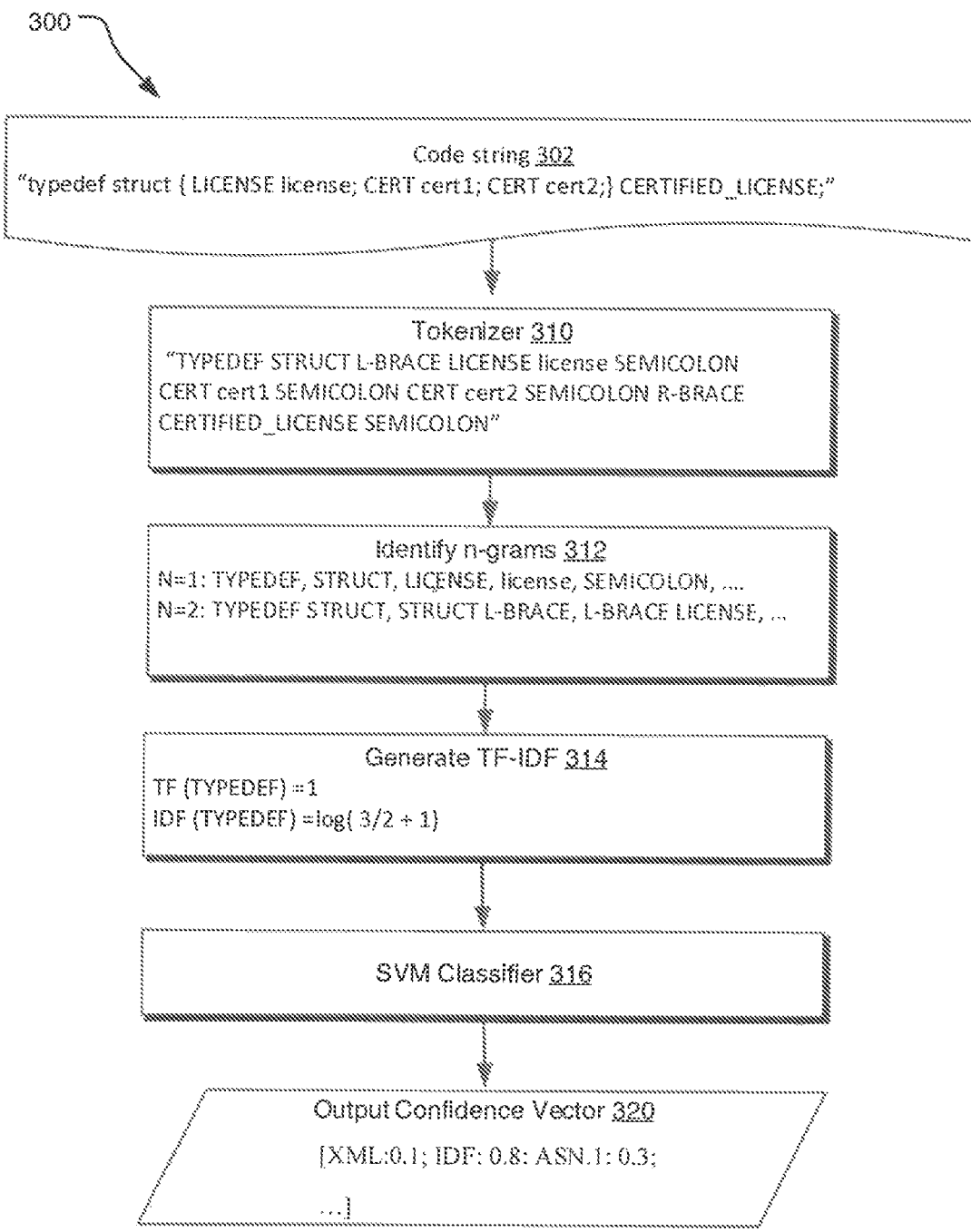
FIG. 3 illustrates an example operations for extracting features using term frequency (TF), inverse document frequency (IDF), and N-grams.

FIG. 3 illustrates an example operations 300 for generating confidence score identifying the type of coding language of code strings. A code string 302 may be input to a tokenizer operation 310 that generates a tokenized version of the code string. An operation 312 identifies various n-grams from the tokenized code string. A TF-IDF operation 314 generates TF-IDF values for the various n-grams to output a TF-IDF vector. Such TF-IDF vector may be input to an SVM classifier 316 that generates an output confidence vector 320 with the confidence score as to the coding language type for the code string 302.

Figure 4:
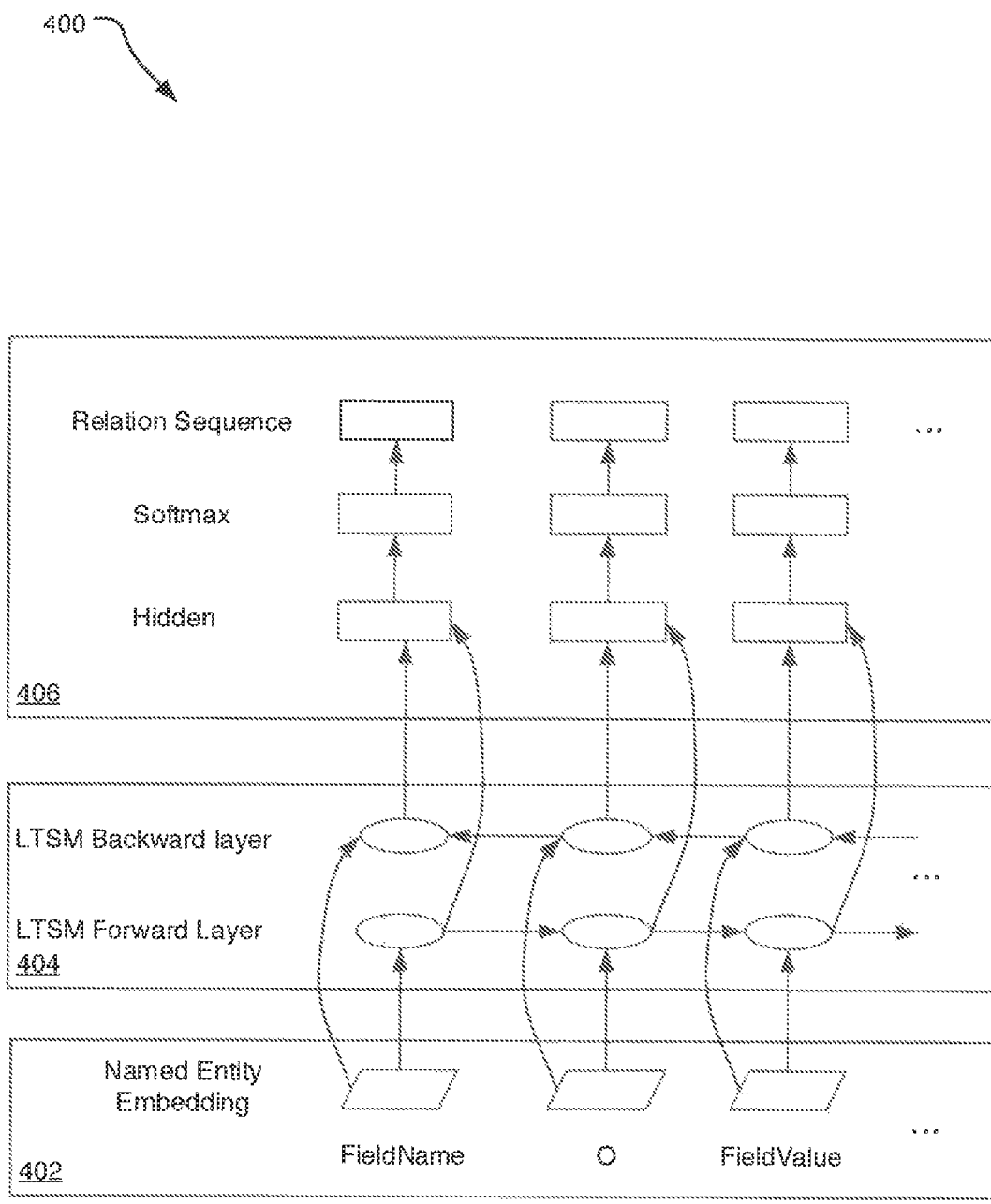
FIG. 4 illustrates an example operations for using classifiers to find the relation between two named entities.

FIG. 4 illustrates example implementation of a relation extraction model 400 of the coding information extractor disclosed herein. In particular, the relation extraction model 400 uses Long short-term memory (LSTM) that is capable of exploiting longer range of temporal dependencies in the sequences and avoiding gradient varnishing or exploding, the relation extraction model 400 consists of three layers, an input layer 402, an LSTM layer 404, and an output layer 406. The input layer 402 generates representation of each named entities, such as FieldName, FieldValue, etc., received from previous operations such as the NER operation 120 disclosed in FIG. 1. The LTSM layer represents the named entity sequence of the sentence with bidirectional LSTM-recursive neural networks (RNNs). Specifically, each of the LTSM units at time step t receives the named entity embedding as input vector $x_t$, the previous hidden state $h_{t-1}$, the memory cell vector $c_{t-1}$, and produces the new vectors using the following equations:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} + i_t \tan h(W_{xc}x_t + W_{hc}h_{t-1} + b_c)$$

$$o_t = \sigma(W_{xo}x_t + W_{ho}h_{t-1} + W_{co}c_t + b_o)$$

$$h_t = o_t \tan h(c_t)$$

where σ denotes the logistic function, i, f, o, c and h are respectively the input gate, forget gate, output gate, cell activation vectors, and hidden state vector. W are weight matrices and b are bias vectors.

The output layer 406 employs a hidden layer and a softmax output layer to get the relation labels using the following equations:

$$h_t^{(r)} = \tan h(W_{rh}[y_{t-1}; h_t] + b_{rh})$$

$$y_t = \text{softmax}(W_{ry}h_t^{(r)} + b_y)$$

where, b and h are respectively the weight matrices, bias vectors, and hidden states. The output layer 406 outputs a relation label sequence that represents the relations between a current entity and a first named entity. As the relation extraction model 400 extracts relations between the first named entity in input and a current entity, in one implementation, the named entities are removed from the start so as to predict several relations with different inputs to get all the relations in an input code string.

Figure 5:
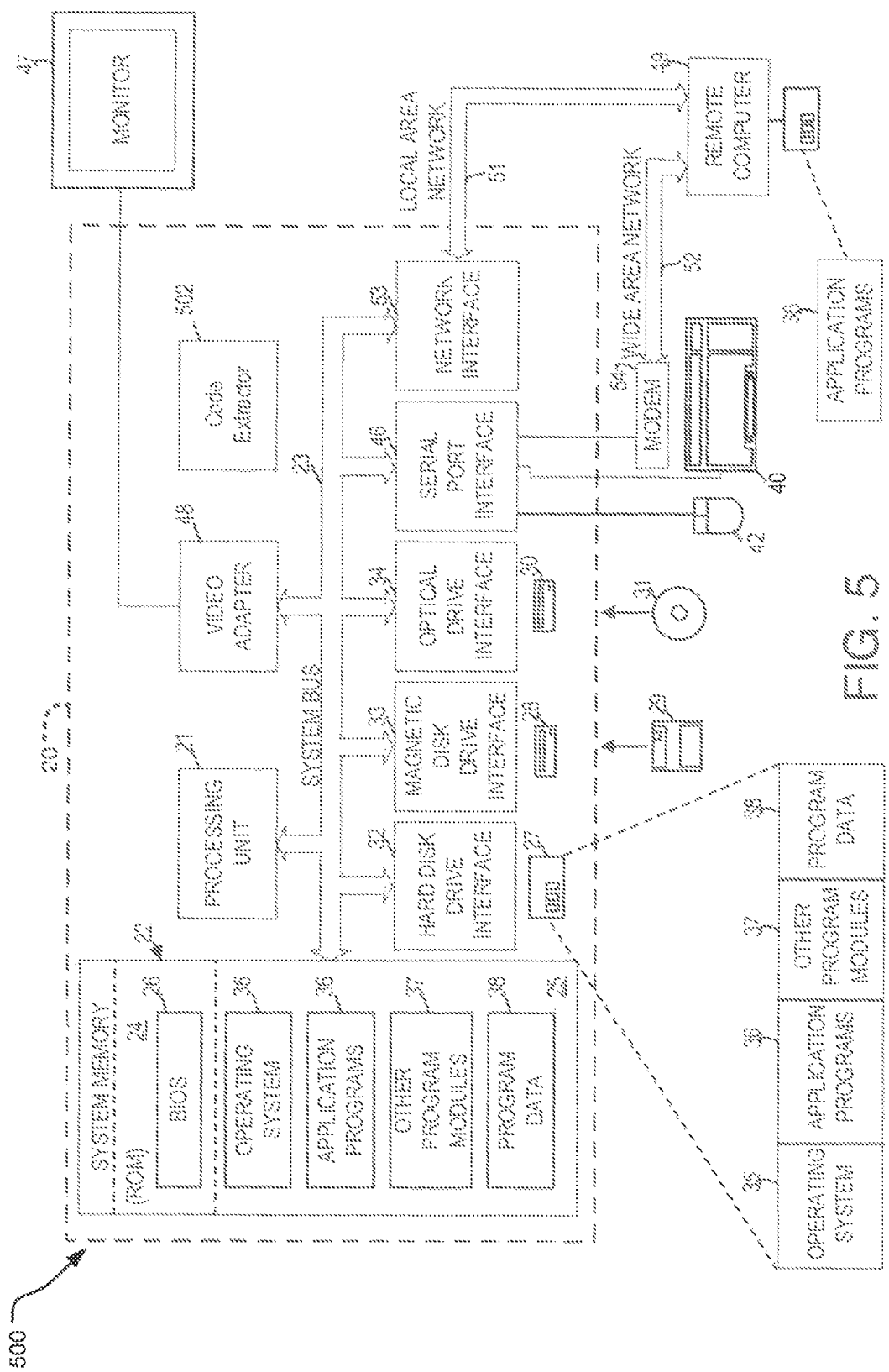
FIG. 5 illustrates an example computing system that may be useful in implementing the described technology for extracting code.

FIG. 5 illustrates an example system 500 that may be useful in implementing the described technology for providing code information extractor. The example hardware and operating environment of FIG. 6 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of the computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 28, optical disk 30, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB)(not shown). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 10 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for providing attestable and destructible device identity may be stored in memory 22 and/or storage devices 29 or 31 and processed by the processing unit 21. One or more ML, NLP, or DLP models disclosed herein may be stored in memory 22 and/or storage devices 29 or 31 as persistent datastores. For example, a coding information extractor module 502 may be implemented on the computer 20 (alternatively, the coding information extractor module 502 may be implemented on a server or in a cloud environment). The coding information extractor module 502 may utilize one of more of the processing unit 21, the memory 22, the system bus 23, and other components of the personal computer 20.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A physical article of manufacture including one or more tangible computer-readable storage media, encoding computer-executable instructions for executing on a computer system a computer process to provide attestable and destructible device identity, the computer process comprising:
   scanning a code document to generate a plurality of tokens;
   based on the plurality of tokens, generating term frequency (TF) values and inverse document frequency (IDF) values;
   based on the term frequency (TF) values and the inverse document frequency (IDF) values, generating a confidence vector indicating a likely programming language type from among a plurality of different programming language types of one or more of the tokens; and
   determining at least one of a field type, a field name, and a field value of the one or more of the tokens using named entity recognition (NER).

2. The physical article of manufacture of claim 1, wherein the computer process further comprising generating links between the one or more of the tokens using an entity relation extraction model.

3. The physical article of manufacture of claim 2, wherein the relation extraction model is a long short term memory (LTSM) model.

4. The physical article of manufacture of claim 2, wherein the confidence vector is generated by a support vector machine (SVM) classifier.

5. The physical article of manufacture of claim 1, wherein the confidence vector comprises a plurality of confidence scores related to a plurality of programming language classifiers.

6. The physical article of manufacture of claim 1, wherein the scanning of the code document to generate the plurality of tokens comprises generating tokens representing words, numbers, and other symbols within a sentence.

7. The physical article of manufacture of claim 6, wherein the scanning of the code document to generate the plurality of tokens further comprises using a plurality of predefined rules to map at least one or more of known characters and words to predefined tokens.

8. The physical article of manufacture of claim 6, wherein the computer process further comprising preprocessing the code document to group a plurality of different words into a single predetermined word.

9. In a computing environment, a method performed at least in part on at least one processor, the method comprising:
   scanning a code document to generate a plurality of tokens;
   based on the plurality of tokens, generating n-grams for terms in the code document, where n is a natural number;

based on the n-grams, generating term frequency (TF) values and inverse document frequency (IDF) values;

based on the term frequency (TF) values and the inverse document frequency (IDF) values, generating a confidence vector indicating a likely programming language type from among a plurality of different programming language types of one or more of the tokens; and determining at least one of a field type, a field name, and a field value of the one or more of the tokens using named entity recognition (NER).

10. The method of claim 9, wherein the computer process further comprising generating links between the one or more of the tokens using an entity relation extraction model.

11. The method of claim 10, wherein the relation extraction model is a long short term memory (LTSM) model.

12. The method of claim 10, wherein the confidence vector is generated by a support vector machine (SVM) classifier.

13. The method of claim 9, wherein the confidence vector comprises a plurality of confidence scores related to a plurality of programming language classifiers.

14. The method of claim 13, wherein the computer process further comprising preprocessing the code document to group a plurality of different words into a single predetermined word.

15. The method of claim 9, wherein the scanning of the code document to generate the plurality of tokens comprises using a plurality of predefined rules to map at least one or more of known characters and words to predefined tokens.

16. In a computing environment, a system comprising:
memory;
one or more processor units;
a document issue scanner system stored in the memory and executable by the one or more processor units, the document issue scanner system encoding computer-executable instructions on the memory for executing on the one or more processor units a computer process, the computer process comprising:

scanning a code document to generate a plurality of tokens;

based on the plurality of tokens, generating term frequency (TF) values and inverse document frequency (IDF) values;

based on the term frequency (TF) values and the inverse document frequency (IDF) values, generating a confidence vector indicating a likely programming language type from among a plurality of different programming language types of one or more of the tokens;

determining at least one of a field type, a field name, and a field value of the one or more of the tokens using named entity recognition (NER); and generating links between the one or more of the tokens using an entity relation extraction model.

17. The system of claim 16, wherein the relation extraction model is a long short term memory (LTSM) model.

18. The system of claim 17, wherein the the confidence vector is generated by a support vector machine (SVM) classifier.

19. The system of claim 18, wherein the confidence vector comprises a plurality of confidence scores form a plurality of programming language classifiers.

20. The system of claim 16, wherein the field type, the field name, and the field value correspond to named entities identified by the named entity recognition (NER); and wherein the generating of the links between the one or more of the tokens comprises identifying a relation between the named entity of one token and the named entity of another token from among the one or more of the tokens using a trained classifier.

* * * * *